C. W. GOOCH.
CALCULATING MACHINE.
APPLICATION FILED FEB. 24, 1914.

1,128,679.

Patented Feb. 16, 1915.

Witnesses
Martin H. Olsen
Robert Hobberman Inventor
Claiborne W. Gooch
By Rector Hibben Davis & Macauley
his Attys

C. W. GOOCH.
CALCULATING MACHINE.
APPLICATION FILED FEB. 24, 1914.

1,128,679.

Patented Feb. 16, 1915.
4 SHEETS—SHEET 2.

Witnesses
Martin H. Olsen
Robert Dobbenman

Inventor
Claiborne W. Gooch

C. W. GOOCH.
CALCULATING MACHINE.
APPLICATION FILED FEB. 24, 1914.

1,128,679.

Patented Feb. 16, 1915.

Witnesses
Martin H. Olsen.
Robert Dobberman.

Inventor
Clairmont W. Gooch

C. W. GOOCH.
CALCULATING MACHINE.
APPLICATION FILED FEB. 24, 1914.

1,128,679.

Patented Feb. 16, 1915.
4 SHEETS—SHEET 4.

Witnesses
Martin H. Olsen
Robert Dobberman

Inventor
Claiborne W. Gooch
By Kerr, Kibben, Davis & Macauley
his Attys

UNITED STATES PATENT OFFICE.

CLAIBORNE W. GOOCH, OF DETROIT, MICHIGAN, ASSIGNOR TO BURROUGHS ADDING MACHINE COMPANY, OF DETROIT, MICHIGAN, A CORPORATION OF MICHIGAN.

CALCULATING-MACHINE.

1,128,679.     Specification of Letters Patent.     Patented Feb. 16, 1915.

Application filed February 24, 1914. Serial No. 820,680.

*To all whom it may concern:*

Be it known that I, CLAIBORNE W. GOOCH, a citizen of the United States, residing at Detroit, in the county of Wayne and State of Michigan, have invented certain new and useful Improvements in Calculating-Machines, of which the following is a description, reference being had to the accompanying drawings, forming part of this specification.

I have illustrated, and will describe, my invention as employed in the type of calculating machine shown in the Horton Patent No. 1,016,501, dated February 6, 1912, but as will be understood from the description of it hereinafter given it is equally applicable to and may be embodied in a wide variety of machines.

It relates primarily to the carrying or transfer mechanism between the successive numeral wheels of the machine, whereby when any given wheel completes a revolution the next higher wheel in the series is advanced one step or number; and it has for its object the provision of simplified and improved means for this purpose, whereby such transfer or carry is invariably made with accuracy under all conditions of operations of the machine.

My novel carrying mechanism also lends itself to the provision of a very simple and efficient means for clearing or zeroizing the numeral wheels, which constitutes a further feature of my invention.

In the accompanying drawings I have first illustrated my invention as originally embodied by me in a simple model, by means of which it may be more readily and clearly explained, and have then illustrated it as subsequently embodied by me in a complete calculating machine of the type of that mentioned.

Referring now to the first mentioned drawings, Fig. 9ª an axial section through the numeral wheels and carrying devices of the preceding views.

Figure 1:
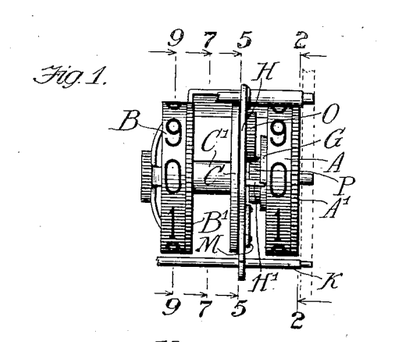
Figure 1 represents a top plan view of two adjacent numeral wheels of a series of such wheels, and the carrying mechanism interposed between them, by means of which at each revolution of the lower wheel the higher one is advanced one step or number.
Figure 2:
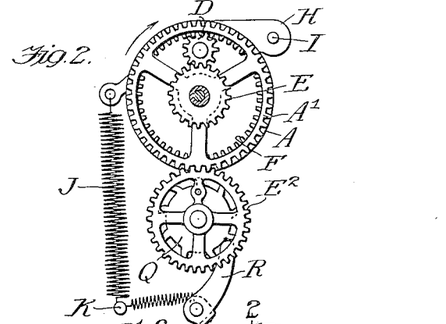
Fig. 2 an elevation of the right side of the same parts.

Referring first to Fig. 1 of the drawings, A represents the lower one of two adjacent numeral wheels of a series, B the higher one, and C an intermediate internal gear wheel hereinafter described. Located immediately at the right of each of the numeral wheels is an external gear wheel, that beside the lower numeral wheel being designated A′ and that beside the higher numeral wheel B′. The former of these two gear wheels, A′, is best shown in Fig. 2, where it will be seen meshing with a smaller gear wheel E² beneath it, by which it is driven from the actuating mechanism of the machine. The large gear wheels A′ B′ correspond to the gear wheels L of the Horton patent heretofore referred to, and the small gear wheels E² to the gear wheels I′ of that patent.

Figure 9:
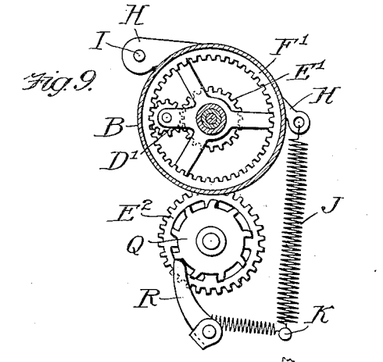
Fig. 9 a vertical section in the plane of line 9—9 of Fig. 1, being a section through the rim of the second numeral wheel, and also looking toward the right.
Figure 9A:
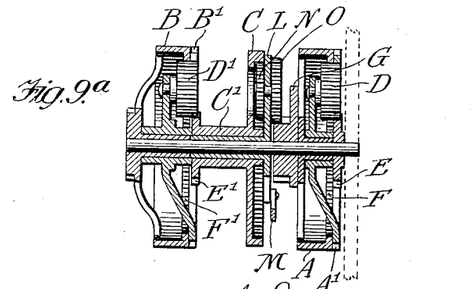

The gear wheel A′ carries a planet gear D, Figs. 2 and 9ª, which meshes upon its inner side with a sun-gear E. In the case of the lowest order numeral wheel—the wheel A in the present instance—the sun-gear E is secured in fixed position, so that the planet-gear D travels around its periphery as the gear wheel A′ is turned. The planet gear D is of sufficient width to mesh not only with the sun-gear E at its inner side, as shown in Figs. 2 and 9ª, but at its outer side with an internal gear F formed upon the numeral wheel A immediately at the left of the gear wheel A′, with the result that as the gear wheel A′ is turned by the driving mechanism of the machine, and the planet-gear D caused to travel around the fixed sun-gear E, the rotation of the planet gear D upon its own axis will serve to advance the numeral wheel A.

The planetary gearing just described is the same as that in the Horton patent, the planet gear D corresponding to the planet gear M′ of that patent, the sun-gear E to the sun-gear M², and the internal gear F of the numeral wheel to the internal gears N of the numeral wheels of that patent.

Figure 4:
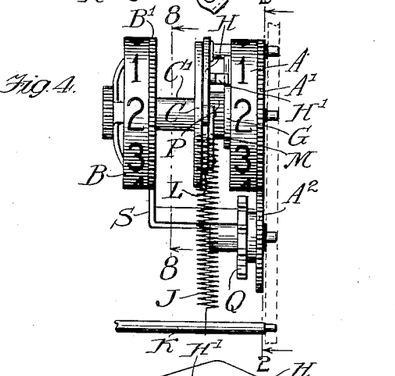
Fig. 4 a front elevation.
Figure 5:
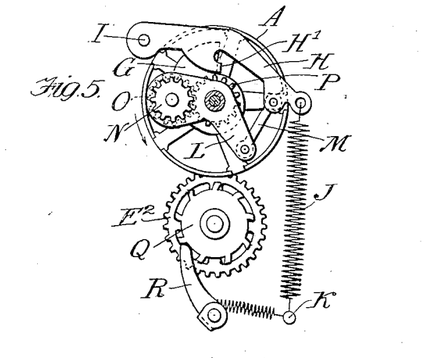
Fig. 5 a vertical section in the plane of the dotted line 5—5 of Fig. 1, looking toward the right or lower numeral wheel and with the latter in its zero position.
Figure 6:
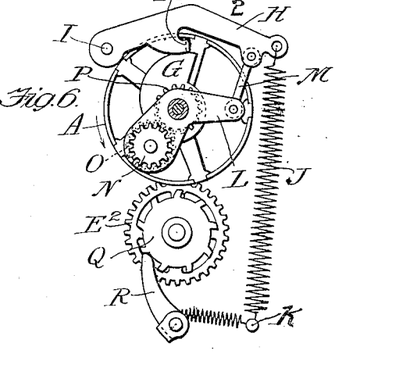
Fig. 6 a corresponding view with the numeral wheel in its "9" position.

Fast upon the left side of the numeral wheel A is a snail-cam G, Figs. 5, 6 and 9ª, which coöperates with and serves to retract a spring-pressed carrying-lever H hung at its rear end upon a rod I, and having connected to its front end the upper end of a coiled spring J whose lower end is secured to a cross rod K. About midway of its length the lever H is provided with a short arm or lug H′ projecting to the right from the body of the lever and overlying and resting upon the cam G, Figs. 1 to 6, with the result that as the numeral wheel A is turned from its zero position, shown in Fig. 5, the cam G will ride under the projecting arm or lug of the lever H and lift the lever to or toward the position shown in Fig. 6, where the numeral wheel and cam are shown in their "9" position. As the wheel is turned on farther, past its zero position, the tail of the cam will be carried from under the lever H and the spring J will thereupon retract the lever to or toward the position shown in Fig. 5 again.

Figure 7:
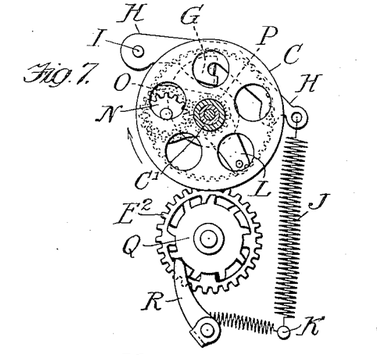
Fig. 7 a vertical section in the plane of the dotted line 7—7 of Fig. 1, looking toward the right or lower numeral wheel.

Mounted upon the axial supporting shaft of the train of numeral wheels, at the left of the cam G and in the present instance in approximately the same vertical plane as the lever H, is a gear-carrying lever L whose front end is connected by a link M to the lever H, the link M being pivotally connected at its opposite end to the respective levers L and H. At its opposite end the lever L carries a pair of planet-gears N and O upon its opposite sides, said gears being secured to the opposite ends of a short stub shaft journaled in the lever L, Fig. 9ª. The planet-gear O meshes with a sun-gear P fast upon the left-hand side of the cam G, which in turn is fastened to the left side of the numeral wheel A, so that all three of said parts P, G and A turn together, while the planet-gear N on the left side of the lever L meshes with the internal gear of the wheel C heretofore referred to, as best shown in Figs. 7 and 9ª.

It results from the foregoing construction that each time the lever H is lifted by the cam G the gear-carrying lever L will be rocked on its fulcrum and its gear O caused to travel downward and forward around the sun-gear P carried by the numeral wheel A, from the position of Fig. 5 to or toward that of Fig. 6. This will cause the planet-gear O, and consequently the planet-gear N, to turn upon their own axis in a clockwise direction, during such movement of the levers H and L produced by the lifting movement of the cam G, and the gear N will roll idly forward upon the internal gear of the wheel C, Fig. 7, without turning the latter. When, however, the numeral wheel A completes a revolution, and the tail of the cam G is carried from under the lever H and the spring J retracts said lever, and with it the lever L, swinging the lower end of the latter rearward and upward from the position shown in Fig. 6 to or toward that shown in Fig. 5, the internal gear wheel C will be turned in a clockwise direction by the planet-gear N.

If we assume that the numeral wheel A has been turned to exactly zero position (instead of beyond such position) at the operation which has caused the cam to release the lever H and permit the parts to be retracted by the spring J, in the manner just described, the numeral wheel, and consequently its sun-gear P, will be at rest and stationary during such retraction of the parts and such return of the gear-carrying lever L from the position of Fig. 6 to that of Fig. 5. The result, under such conditions, will be that the planet-gears O and N will be rotated upon their own axis, and in a clockwise direction, during such return movement of the lever L; and the gear N, being in mesh with the internal gear of the wheel C, will consequently turn said wheel in a like direction. The proportions of the parts are such, in the present instance, that such full movement of the gear-carrying lever L from the position of Fig. 6 to that of Fig. 5 will cause the internal gear wheel C to be turned forward or in a clockwise direction one-fifth of a revolution, and such movement of the gear wheel C will be transmitted to the numeral wheel B and serve to advance the latter one step or number, as hereinafter explained.

If we now assume an operation in which the lower order numeral wheel A is carried beyond zero position at one continuous movement—for instance from its "7" position to its "5" position by the addition of 8 upon it at any given operation of the machine—the operation and result of the carrying mechanism will be as follows: When the tail of the cam G clears the projection H′ upon the lever H, as the numeral wheel A passes zero position, and releases the lever, the spring J will retract the lever H and the gear-carrying lever L toward normal position as before, and if the numeral wheel A is being turned slowly the resulting operation will not be substantially different from that before described. But if the numeral wheel (and consequently its cam G) are being turned very rapidly at such time the lower portion of the rise of the cam, succeeding its higher portion or tail, may offer an obstruction to the complete return movement of the parts to their normal position shown in Fig. 5, and prevent complete return of them to that position. Nevertheless, under such circumstances, the internal gear-wheel C will be advanced a full one-fifth of a revolution, as before, and an accurate transfer or carry be effected. This is due to the fact that if the numeral wheel is turned beyond zero position at any given operation its sun-gear P will continue to turn with it from zero position to the point at which it comes to rest, and during such continued movement of the wheel and sun-gear beyond normal position the sun-gear will act upon and rotate the planetary gears O and N carried by the lever L. Now, at such time (i. e., during the movement of the numeral wheel and sun-gear beyond zero position) the spring J will be returning the gear-carrying lever L toward normal position, and the clockwise movement given to the planet gears by such return movement of the parts will be supplemented and accelerated by the like movement transmitted to said gears by the sun-gear of the numeral wheel. In other words, the planet-gears carried by the lever L will be turned in a clockwise direction both by the return movement of the lever L toward normal position (as they are when the numeral wheel and sun-gear are at rest during the return movement of the parts) and also by the continued rotation of the numeral wheel and sun-gear beyond their zero position, with the result that any incompleteness in the return movement of the gear-carrying lever L will be compensated for by the additional movement given the planet-gears by the rotating sun-gear, so that the internal gear wheel C will, under all circumstances and conditions, be turned forward the same distance, in this instance one-fifth of a revolution, at each release and retraction of the levers H and L.

The internal gear wheel C is provided upon its left side with an extended hub or sleeve C', Figs. 1, 4, 7 and 9ª, upon whose left-hand end is formed or secured a sun-gear E' with which meshes the planet gear D' carried by the gear wheel B' associated with the numeral wheel B, Figs. 8, 9 and 9ª, such sun-gear corresponding to the sun-gears M² of the Horton patent, and the planet-gear D' corresponding to the planet-gears M' of that patent, as heretofore explained in connection with the sun-gear E and planet-gear D of the present construction. The planet-gear D' not only meshes at its inner side with the sun-gear E', but at its outer side with the internal gear F' of the numeral wheel B, Figs. 3, 8, 9 and 9ª, with the result that at each one-fifth of a revolution of the gear wheel C and its sun-gear E' in a clockwise direction (anti-clockwise in Fig. 8) the numeral wheel B will be turned one-tenth of a revolution in the opposite direction, to register the transfer or carry from the numeral wheel A, the sun-gear E' in the present instance having one-half as many teeth as the internal gear of the numeral wheel B, Fig. 8.

If it be assumed that the numeral wheel B and its associated gear wheel B' are at rest at the time the above-described transfer or carry takes place, the operation will simply be that the turning of the sun-gear E' in a clockwise direction (anti-clockwise in Fig. 8) through one-fifth of a revolution will turn the planet gear D' in the opposite direction upon its own axis, and such rotation of the planet gear upon its own axis will cause it to turn the numeral wheel B in the same direction, the proportions of the gearing being such that the one-fifth of a revolution of the sun-gear E', thus transmitted through the planet gear D' to the numeral wheel B, will turn the latter one-tenth of a revolution, as before stated.

The above described actuation of the gear wheel B' and numeral wheel B by the sun-gear E', through the medium of the planet gear D', to effect the transfer or carry from the numeral wheel A, is the same as in the Horton patent heretofore referred to, as is also the operation of effecting such a transfer or carry to the numeral wheel B at a time when the latter and its associated gear wheel B' are being directly turned by the actuating mechanism of the machine under the impulse of an operated key in the row or series corresponding to such wheel. Under such conditions the movement transmitted to the gear wheel B' and numeral wheel B directly from the actuating mechanism of the machine will be supplemented by the movement transmitted to them from the sun-gear E', so that the numeral wheel will be turned one step farther than it would have been turned by the direct action of the actuating mechanism of the machine, and thus the transfer or carry will be effected notwithstanding the fact that the numeral wheel B is itself in motion at the time the numeral wheel A completes a revolution and releases the spring-pressed levers of the carrying mechanism to effect a transfer—all as in the mechanism of the Horton patent referred to.

Figure 3:
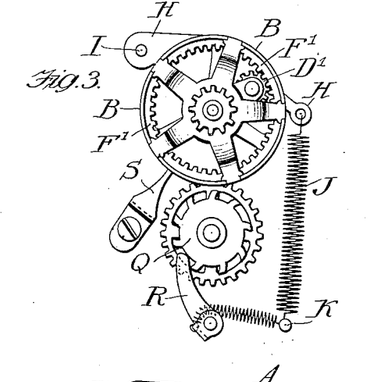
Fig. 3 an elevation of the left side thereof.

A toothed stop wheel Q, Figs. 2, 3, 5, 6 and 7, fast upon the side of the hub of the gear wheel E², and engaged by a spring-pressed stop pawl R prevents backward rotation of the parts. A stop S engaging the teeth of the gear wheel B' of the numeral wheel B, Figs. 3 and 4, is also present in the model from which the foregoing illustrations were made, for the purpose of holding the gear wheel B' from rotation. In the actual machine in which the mechanism is incorporated no such stop is present, since each of such gear wheels is in gear with the rack or sector of its corresponding actuating device, and is held at rest by such device excepting when the latter is itself moved by the operation of a key in the corresponding row or series.

Figure 10:
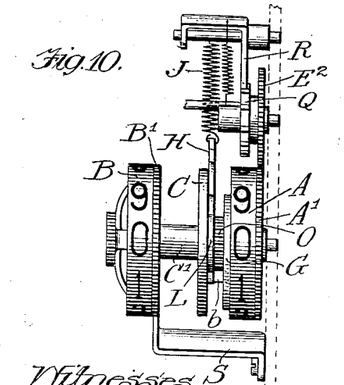
Figure 11:
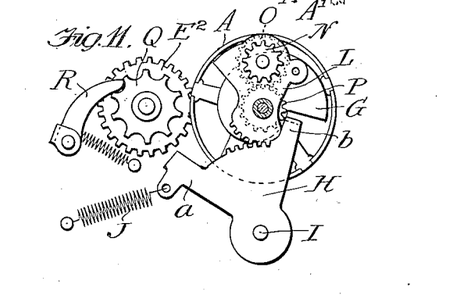
Figure 12:
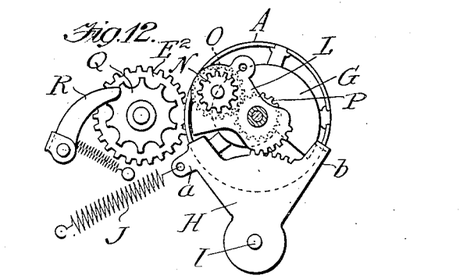

In Figs. 10, 11 and 12 I have shown a slightly modified construction of the carrying mechanism heretofore described, operating upon the same principle and in substantially the same manner, the same letters of reference being applied to the parts in these additional views which correspond in function to those illustrated in the preceding views. Referring to Figs. 11 and 12, it will be seen that there is mounted upon the cross-rod I beneath the numeral wheels a lever H in the form of a rocking sector arm or plate having a series of gear teeth formed upon its upper edge concentric with the pivot or fulcrum of the lever. This lever H corresponds in purpose and function with the lever H of the previously described construction, and the gear teeth upon its upper edge mesh with the corresponding gear teeth formed upon the lower end of a gear-carrying lever L corresponding to the gear-carrying lever L of the previously described construction, and, like the latter, carrying upon its opposite sides a pair of planet gears N and O, such gears being secured to the opposite ends of a short shaft journaled in the lever L. As in the previously described construction, the planet gear O meshes with a sun-gear P fast upon the hub of the lower numeral wheel A, while the planet gear N engages the internal gear of the wheel C located between the numeral wheels A and B.

The sector-shaped lever H is provided at the opposite sides or corners of its upper end with short projecting arms $a$ and $b$, to the former of which is connected the retracting spring J for the lever, and the latter of which is bent laterally to the right or toward the numeral wheel A, Fig. 10, and coöperates with a snail cam G fast upon the hub of said wheel. In Fig. 11 the wheel A is shown in its zero position, and the lever H retracted to the left to its limit of movement; while in Fig. 12 the wheel A is shown in its "9" position, in which position the cam G has forced the lever H to the left, against the resistance of its retracting spring J, through approximately nine-tenths of its full limit of movement. As the numeral wheel A is turned on to zero position, from the position shown in Fig. 12, the tail of the cam G will be carried out of the path of the laterally bent arm $b$ of the lever H and the latter will be retracted to or toward the position of Fig. 11 by the spring J.

As will be understood from the foregoing description, at each advance of the numeral wheel A from zero position the gear-carrying lever L is swung in one direction by the cam G, and as the wheel completes a revolution the lever is released and retracted to or toward normal position by the spring J, as in the case of the construction previously described. During such movements of the lever L its planet gears O and N will coöperate with the sun-gear P and with the internal gear of the wheel C, respectively, as in Figs. 5, 6 and 7 of the previously described construction, and with the same result. That is to say, at each of such actuations of the gear-carrying lever L (in one direction by the cam G and in the other by the spring J) the internal gear wheel C will be turned one-fifth of a revolution in a clockwise direction—and this whether the numeral wheel A comes to rest in zero position, so that the levers H and L are retracted fully to normal position by the spring J, or is turned beyond zero position and turned so rapidly that the cam G may be interposed in the path of the arm of the lever H before the latter and the lever L are retracted completely to normal position, and therefore prevent complete return of them to such position, as explained in connection with the previously described construction.

Figure 8:
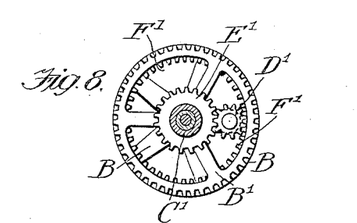
Fig. 8 a vertical section in the same plane looking toward the left.

The hub of the internal gear wheel C carries at its left-hand end a sun-gear corresponding to the sun-gear E' of the previously described construction, Fig. 8, and coöperating in the same manner with a planet gear carried by the gear wheel B' associated with the numeral wheel B and engaging the internal gear upon the latter wheel, as in Fig. 9.

The upper end of the arm $a$ of the lever H is shaped to form a stop surface to coöperate with a corresponding surface formed upon the gear-carrying lever L, at the end of the movement of the latter to the left (just as the tail of the cam G clears the laterally-bent end of the arm $b$ at the opposite or forward corner of the lever H,) and thereby prevent any overthrow of the lever L in the direction in which it is moved by the cam G. In the opposite position of the parts, Fig. 11, the forward side of the lower end of the lever L coöperates as a stop surface with the rear side of the arm $b$ of the lever H, and prevents any overthrow of the lever L in the opposite direction.

In the two models from which the drawings thus far described were made, a numeral wheel corresponding to those employed in the machine of the Horton patent was utilized for the higher order wheel as a matter of convenience, and has accordingly been shown in the drawings made from said models; but in the full-sized complete calculating machines in which I have embodied my invention the numeral wheels are all like the right-hand or lower order numeral wheel of the drawings, as hereinafter shown and described in connection with the illustrations of such full-sized machine.

As will be understood from the foregoing description, I have provided, in the two slightly differing constructions illustrated and described, a very simple and efficient carrying mechanism, by means of which the complete revolution of a lower order numeral wheel will cause the next higher wheel in the series to be advanced one step or number, and this whether such higher order wheel be at the time in motion, under the direct operation of the actuating mechanism of the machine, or be at rest, with the result that the transfer or carry from one numeral wheel to the next higher in the series will be invariably effected with accuracy under all conditions of operation.

Having illustrated and described the principle and mode of operation of my novel carrying mechanism, and the details of its construction as embodied in simple illustrative models, I will now proceed to an illustration and description of it as I have embodied it in complete full-sized commercial calculating machines, where it is associated with the various mechanisms of such machine, and in connection with which the method of clearing the numeral wheels or re-setting them to zero position will be explained.

In the additional views of the drawings to be now referred to, Fig. 13 represents a top plan view of a part of the forward portion of a calculating machine embodying my present invention, with the inclosing casing removed.

Figure 13:
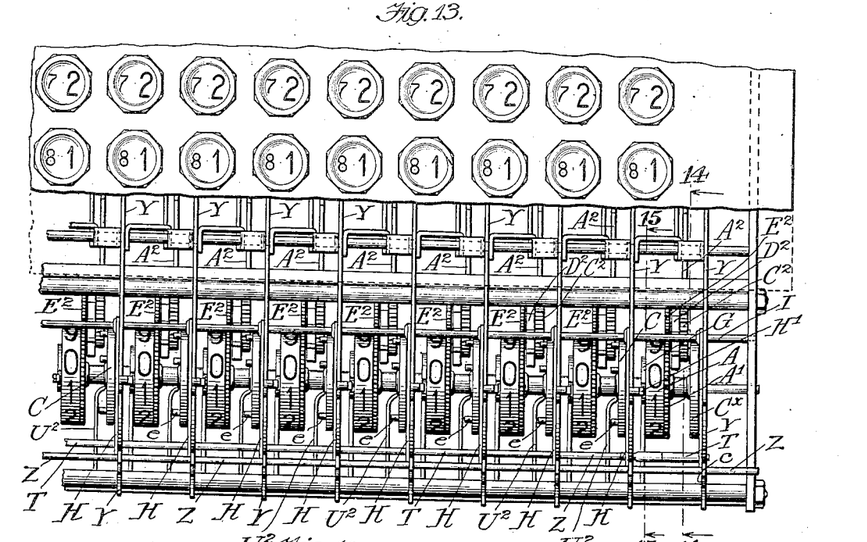

By reference to Fig. 13, the numeral wheels corresponding to the wheels A and B of Figs. 1 to 12, their associated gear wheels corresponding to the gear wheels A', B', and the interposed internal gear wheels C, will be readily identified. In the particular machine here illustrated there is one of the internal gear wheels C secured in fixed position at the right of the lowest order numeral wheel, Fig. 13, but it performs no function as a gear wheel and is present merely as a convenient means of providing the fixed sun-gear E, Fig. 14, which is secured to or formed upon the left-hand end of its hub and coöperates with the planet gear D carried by the gear wheel A' of the lowest order numeral wheel A, as in Fig. 2.

Figure 16:
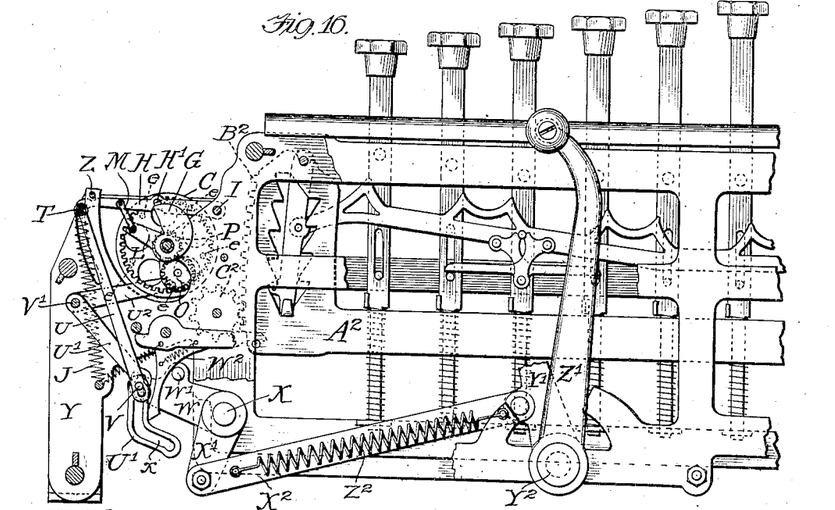
Fig. 16 a corresponding view with the clearing or zeroizing handle pulled forward to its limit of movement and the parts moved by it in corresponding position.

The cam-actuated and spring-retracted levers H of Figs. 1 to 9 will also be readily identified in Figs. 13 to 16, where it will be seen that their front ends, to which the retracting springs J are connected, project over or into the path of, and are suitably shaped to be engaged by, a cross-rod T extending from side to side of the machine in front of the numeral wheels. This cross-rod is secured and supported, at several points intermediate of its length, in the upper ends of approximately vertical arms U, Figs. 14, 15 and 16, whose lower ends are slotted and engaged by a cross-rod V extending from side to side of the machine and secured in and carried by a series of arms W fast upon and projecting forwardly and downwardly from a rock shaft X which is journaled at its opposite ends in the side frames of the machine. At each clearing or zeroizing operation of the machine the shaft X is rocked in a direction to swing the front ends of the arms W and the cross-rod V carried by them upward from the position shown in Figs. 14 and 15 to that shown in Fig. 16, and to consequently lift the cross-rod T, with the result that all of the carrying-levers H will be picked up by said cross-rod T, in whatever position they may be resting, and be lifted to the position shown in Fig. 16. This lifting of the levers H will of course lift the front ends of the gear-carrying levers L, and swing their rear ends downward and forward, as in Figs. 5 and 6. During such downward and forward movement of the rear ends of the levers L, Figs. 15 and 16, the planet gears N carried by them will travel upon the internal gears of the wheels C as fixed racks, and each planet gear N be consequently rotated upon its own axis in a clockwise direction, Figs. 5 and 6, (in the reverse direction, Figs. 15 and 16.) This rotation of the planet gear N upon its own axis will rotate the planet gear O in the same direction, and as the planet gear O is in mesh with the sun-gear P upon the hub of the next lower numeral wheel the result will be that such rotation of the planet gears N and O in one direction upon their own axes will serve to rotate the lower order numeral wheel in a reverse direction. The proportions of the parts and the extent of upward movement given the levers H by the cross-rod T when the latter is lifted from the position of Figs. 14 and 15 to that of Fig. 16 are such that all of the numeral wheels (excepting the units wheel, hereinafter referred to), will be turned to their "9" positions, as in Fig. 16, and this regardless of the positions in which they may have been standing at the beginning of the canceling operation and upward movement of the cross-rod T, since the latter will simply pick up the carrying levers H, wherever it comes in contact with their front ends, and carry them on upward with it to its limit of movement.

The carrying lever H located between the first and second numeral wheels at the right is lifted one step higher, at each of the operations above described, than are the carrying levers H located between the succeeding wheels at the left, with the result that the lowest order numeral wheel, instead of being turned only to its "9" position, as are the other wheels, Fig. 16, will be turned on to zero position. Its cam G will be therefore carried beyond and out of the path of the lateral projection upon the lever H, as in Figs. 5 and 15, while the cams G of all the succeeding wheels to the left will stand in the position shown in Figs. 6 and 16, with their highest portions beneath the projections upon the levers H. It results from this provision that when the cross-rod T, by which the levers H have been lifted, is lowered all the levers H excepting that located between the first and second numeral wheels will be temporarily arrested, in their downward movement, by engagement with their respective cams G, whereas the lever H located between the first and second numeral wheels will be free to descend (being retracted by its spring J) with the cross-rod T. This retraction of this particular lever H in advance of the retraction of the succeeding levers at the left of it will cause the internal gear C located between the first and second numeral wheels to be turned forward one-fifth of a revolution, in the manner heretofore explained, and such turning of said wheel will cause the next succeeding numeral wheel at its left to be turned rearward one-tenth of a revolution, as also heretofore explained, and thereby carry such wheel from its "9" to its zero position. Such movement of the second numeral wheel from "9" to zero position will cause its cam G to release the carrying lever H at its left, whereupon said lever will immediately be retracted by its spring J and the internal gear wheel C at the left of such lever will be given one-fifth of a revolution, and such movement of that internal gear wheel will be transmitted to the next succeeding numeral wheel at the left and serve to advance it from its "9" to zero position; and so on in succession through the entire series of wheels, all of them being brought to zero position at the end of the operation.

The extra one step upward movement of the right-hand carrying lever H, heretofore mentioned, may be effected by making the cross-rod T thicker, or surrounding it with a sleeve, at the point at which it engages such lever H, as indicated in Figs. 13 to 16.

The cross-rod T is guided in its vertical movements in curved slots $c$ formed in the upper forward portions of division plates Y of the frame of the machine, and secured in the extreme upper ends of the upwardly extending arms of such plates, in rear of the slots referred to, is a cross-rod Z which operates as a stop rod for the levers H and prevents any excessive upward movement of them when they are lifted by the cross-rod T. The upper surface of the right-hand lever H is notched where it engages the rod Z, or other provision made, to permit said lever to be moved one step higher than the other levers.

Figure 14:
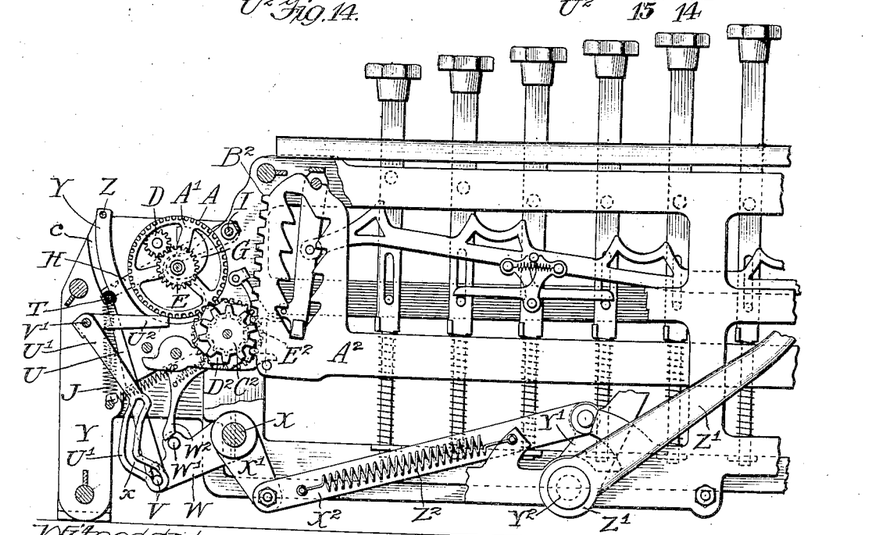
Fig. 14 a view partly in section (see dotted line 14—14) and partly in side elevation of the right side or the portion of the machine, with part of the framework broken away to expose the parts beyond it.
Figure 15:
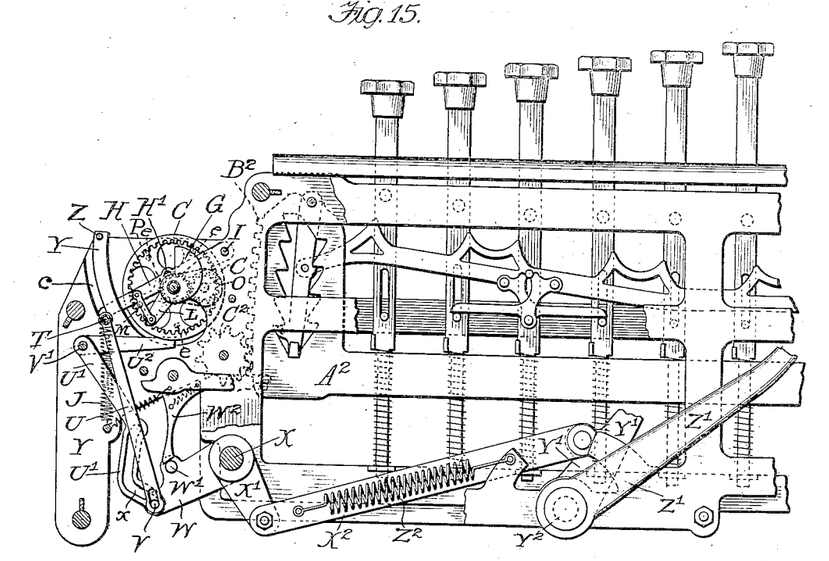
Fig. 15 a vertical section through the same portion of the machine at the left of one of the numeral wheels, (see dotted line 15—15) looking toward the left, with the parts in their normal position of rest and the numeral wheels at zero.

The rock shaft X has secured to its right-hand end, Fig. 14, a downwardly and rearwardly projecting arm $X'$ to whose lower end is connected the front end of a link $X^2$, whose rear end is connected to the upper end of an arm $Y'$ projecting upwardly from a rock-shaft $Y^2$ journaled in the side frame of the machine in rear of the rock-shaft X, to which shaft $Y^2$ an operating handle $Z'$ is applied. The exact details of these parts employed in the machine are not shown in the drawings, but they may be similar to those disclosed in the Horton patent above referred to, or of any other suitable construction or arrangement, it being only necessary that when the operating handle $Z'$ is pulled forward to its limit of movement, as in Fig. 16, it will serve to rock the shaft X and swing upward the arms W and the cross-rod V carried thereby, from the position of Figs. 14 and 15 to that of Fig. 16, and that when released a suitably applied spring $Z^2$ shall restore the parts to normal position.

The cross rod V carried by the arms W, in addition to performing the function of lifting the arms U which carry the cross-rod T, extends through cam-shaped slots $x$ formed in the lower ends of a series of levers $U'$ which are hung at their upper ends on a fixed cross-rod $V'$ and have rearwardly extending integral or otherwise rigid arms $U^2$ which project between the respective internal gear wheels C and the immediately adjacent numeral wheels at their left, Fig. 13, there being one of these levers for each one of said internal gear wheels C. Each of said wheels is provided upon its left side with five equidistant stop pins $e$, Fig. 13, and the extreme rear ends of the arms U² of the levers U' are bent laterally toward the right into position to coöperate with the pins upon the respective wheels C. In the normal position of parts the rear ends of the levers stand below the path of travel of the pins e on the wheels C, Figs. 14 and 15, but when a clearing or zeroizing operation takes place, and the shaft X is rocked to swing upward its arm W and the parts carried and to be lifted thereby, the upward travel of the cross-rod V in the cam slots x in the lower ends of the levers U' will throw the upper rear ends of the arms U² of the latter into the path of the pins e on the wheels C, as shown in Fig. 16, and serve to prevent any backward rotation of the wheels C, i. e. rotation in a clockwise direction as the parts are viewed in Figs. 14, 15 and 16. Inasmuch as this is the direction in which the wheels C tend to rotate, or to be rotated by the planet gears N, when the carrying levers H are lifted by the cross-rod T, it follows, as heretofore explained, that the wheels C are held stationary at such times and their internal gears operate as fixed racks, upon which the planet gears N travel forward and by which said planet gears are rotated upon their own axes, and thereby caused to rotate the numeral wheels of the next succeeding lower orders. When the operating handle by means of which the shaft X has been rocked and its arms W swung upward is released, and said shaft and arms are swung downward to normal position again, the engagement of the cross-rod V with the lower portions of the cam slots in the levers U' will restore the latter to their normal position and withdraw their stop arms from the path of the pins on the wheels C. The shape of the cam slots x in the levers U' is such that the stop arms are thrown into the path of the pins e upon the wheels C near the beginning of the clearing operation and withdrawn therefrom near the end of it, and the slotted engagement of the lower ends of the arms U with the cross-rod V is provided for the purpose of permitting slight upward movement of the rod V, to operate the cam levers U', before the rod begins to lift the arms U, cross-rod T and any of the levers H.

The cam levers U' may also be utilized to operate over-throw-preventing stop-arms for the numeral wheels, such arms coöperating for that purpose with studs or pins upon said wheels when the zeroizing handle is pulled forward quickly or violently to its limit of movement, but as the clearing mechanism which I have illustrated and described is operative without such overthrow-preventing means, and as means for such purpose is illustrated and described in the Horton patent heretofore referred to, I have not thought it necessary to complicate the drawings and specification of the present application with an illustration and description of such provision.

In the machine illustrated in the drawings, Figs. 13 to 16, the individual numeral wheels may be operated by the corresponding column-actuators A² of the machine in the same manner and by the same means as in the machine of the Horton patent, the racks B² of such column-actuators meshing with pinions C² fast upon the right-hand sides of internal ratchets D², Figs. 13 and 14, said internal ratchets being engaged by spring-pressed pawls (not shown) carried by the pinions or gear wheels E² located immediately at the left of such ratchets, Figs. 13 and 14 and meshing with the gear wheels A', B', etc., of the respective numeral wheels, Figs. 2 to 14. Under such construction, during the downward movement of any column-actuator the pinion or gear wheel E² associated with the corresponding numeral wheel remains at rest, and during the upward movement of the column-actuator it is turned (always in the same direction) to an extent determined by the previous downward movement of the actuator, and transmits its movement to the corresponding numeral wheel, as in the machine of the Horton patent. Substantially the same provision may likewise be made in the present instance as in the machine of the Horton patent for normally locking the numeral wheel gears from movement, and for individually unlocking them when their corresponding column-actuators are operated, and for collectively unlocking them at each clearing or zeroizing operation. Thus the latter unlocking may be accomplished by a cross-rod W' carried by the arms W projecting from the rock shaft X, Figs. 14–16, which cross rod engages the depending arms of the locking dogs W² whenever the shaft X is rocked and the arms W swung upward, and forces said depending arms of the locking dogs forward and swings the locking ends of their rearwardly-extending arms downward out of engagement with the locking wheels carried by or turning with the intermediate gears E², as in Fig. 16, and as more fully shown and described in the Horton patent. In the present instance, however, the construction and operation of all the locking dogs are the same, whereas in the Horton patent a special construction of locking dog for the units wheel is provided, which is unnecessary here.

While I have referred, descriptively, to the wheels C as internal gears, it will be understood that they are, mechanically and functionally, the universe gears of the respective sets of planetary gears of which they form a part, and that other forms of universe gears might be substituted for them.

I claim:

1. In a carrying mechanism for calculating machines and the like, the combination, with two adjacent numeral wheels, of an oscillating gear-carrier interposed between said wheels and moved in one direction by the turning of the lower order wheel, and a gear carried by said carrier and in gear with both of said wheels.

2. In a carrying mechanism for calculating machines and the like, the combination, with two adjacent numeral wheels, of a cam turning with the lower one of said wheels, an oscillating gear-carrier moved in one direction by said cam, and a gear carried by said carrier and in gear with both of said wheels.

3. In a carrying mechanism for calculating machines and the like, the combination, with two adjacent numeral wheels, of a cam turning with the lower one of said wheels, a spring-retracted lever moved in one direction by said cam, an oscillating gear-carrier connected with and moved by said lever, and a gear carried by said carrier and in gear with both of the numeral wheels.

4. In a carrying mechanism for calculating machines and the like, the combination, with two adjacent numeral wheels, of a cam and gear turning with the lower one of said wheels, an oscillating gear-carrier moved in one direction by said cam, and a pair of gears carried by said gear-carrier and turning together, one of said gears being in mesh with the gear turning with the lower order numeral wheel and the other in gear with the higher order numeral wheel.

5. In a carrying mechanism for calculating machines and the like, the combination, with two adjacent numeral wheels, of a cam and gear turning with the lower one of said wheels, a spring-retracted lever moved in one direction by said cam, an oscillating gear-carrier connected with and moved by said lever, and a pair of gears carried by said gear-carrier and turning together, one of said gears being in mesh with the gear turning with the lower order numeral wheel and the other in gear with the higher order numeral wheel.

6. In a carrying mechanism for calculating machines and the like, the combination, with a numeral wheel, and a sun-gear turning with it, of an oscillating gear-carrier mounted upon the axis of said sun-gear and moved in one direction by the turning of the numeral wheel, and a planet gear carried by said gear-carrier in mesh with said sun-gear and also in gear with the next higher order numeral wheel.

7. In a carrying mechanism for calculating machines and the like, the combination, with a numeral wheel, and a cam and sun-gear turning with said wheel, of an oscillating gear-carrier mounted on the axis of the sun-gear and moved in one direction by said cam, and a planet gear carried by said gear-carrier in mesh with the sun-gear and also in gear with the next higher order numeral wheel.

8. In a carrying mechanism for calculating machines and the like, the combination, with a numeral wheel, and a cam and sun-gear turning with said wheel, of a spring-retracted lever moved in one direction by said cam, an oscillating gear-carrier connected to and moved by said lever, and a planet gear carried by said carrier in mesh with the sun-gear and also in gear with the next higher order numeral wheel.

9. In a carrying mechanism for calculating machines and the like, the combination, with a numeral wheel and a wheel adapted to be intermittently advanced by said numeral wheel, of a sun-gear and an internal gear, one of said gears turning with the numeral wheel and the other with the other wheel, a planet gear interposed between and engaging the sun-gear and the internal gear, and means for oscillating said planet gear about the axis of the sun-gear and internal gear.

10. In a carrying mechanism for calculating machines and the like, the combination, with a numeral wheel and a wheel intermittently advanced by said numeral wheel, of a sun-gear and an internal gear, one of said gears turning with the numeral wheel and the other with the intermittently-advanced wheel, a planet gear interposed between and engaging said sun-gear and internal gear, means operated by the numeral wheel to oscillate the planet gear in one direction about the axis of the sun-gear and internal gear, and independent means for oscillating the planet gear in the opposite direction about the axis of said gear.

11. In a carrying mechanism for calculating machines and the like, the combination, with a numeral wheel and a wheel intermittently advanced by said numeral wheel, of a sun-gear and an internal gear, one of said gears turning with the numeral wheel and the other with the intermittently-advanced wheel, a planet gear interposed between and engaging said sun-gear and internal gear, a cam turning with the numeral wheel and operating to oscillate the planet gear in one direction about the axis of the sun-gear and internal gear, and a spring for oscillating the planet gear in the opposite direction.

12. In a carrying mechanism for calculating machines and the like, the combination, with a numeral wheel and a wheel intermittently advanced by said numeral wheel, of a sun-gear and an internal gear, one turning with the numeral wheel and the other with the intermittently-advanced wheel, a spring-retracted lever, a cam turning with the numeral wheel and operating to move said lever in one direction, an oscillating gear-carrier connected to and moved by said lever, and a planet gear carried by said gear-carrier and interposed between and engaging the sun-gear and internal gear.

13. In a carrying mechanism for calculating machines and the like, the combination, with a numeral wheel and a sun-gear turning with it, of an internal gear intermittently advanced by the numeral wheel, a planet gear interposed between and engaging said sun-gear and internal gear, and means for oscillating said planet gear about the axis of said sun-gear and internal gear.

14. In a carrying mechanism for calculating machines and the like, the combination, with a numeral wheel and a sun-gear turning with it, of an internal gear intermittently advanced by the numeral wheel, a planet gear interposed between and engaging said sun-gear and internal gear, means for causing the turning of the numeral wheel to oscillate said planet gear in one direction about the axis of the sun-gear and internal gear, and independent means for oscillating it in the opposite direction.

15. In a carrying mechanism for calculating machines and the like, the combination, with a numeral wheel and a sun-gear turning with it, of an internal gear intermittently advanced by the numeral wheel, a planet gear interposed between and engaging said sun-gear and internal gear, a cam turning with the numeral wheel and operated to oscillate the planet gear in one direction about the axis of the sun-gear and internal gear, and a spring for oscillating it in the opposite direction.

16. In a carrying mechanism for calculating machines and the like, the combination, with a numeral wheel and a sun-gear turning with it, of an internal gear intermittently advanced by the numeral wheel, a spring-retracted lever, a cam turning with the numeral wheel and operating to move said lever in one direction, an oscillating gear-carrier connected with and moved by said lever, and a planet gear carried by said gear-carrier and interposed between said sun-gear and internal gear.

17. In a carrying mechanism for calculating machines and the like, the combination, with a numeral wheel and a wheel adapted to be intermittently advanced by said numeral wheel, of a planetary gearing interposed between said wheels, and means for causing the turning of the numeral wheel to oscillate one element of said planetary gearing to intermittently advance the other wheel.

18. In a carrying mechanism for calculating machines and the like, the combination, with two adjacent numeral wheels and an interposed wheel adapted to be intermittently advanced by the lower order numeral wheel, of planetary gearing between the lower order wheel and said interposed wheel, means for causing the turning of the lower order wheel to oscillate one element of the planetary gearing to intermittently advance said interposed wheel, and a second planetary gearing between said interposed wheel and the higher order numeral wheel.

19. In a carrying mechanism for calculating machines and the like, the combination, with two adjacent numeral wheels, of an interposed wheel adapted to be intermittently advanced by the lower order numeral wheel, a sun-gear and an internal gear, one turning with the lower order numeral wheel and the other with said interposed wheel, a planet gear interposed between and engaging said sun-gear and internal gear, means for causing the turning of the lower order numeral wheel to oscillate said planet gear about the axis of the sun-gear and internal gear, to intermittently advance said interposed wheel, and a planetary gearing connecting said interposed wheel with the higher order numeral wheel.

20. In a carrying mechanism for calculating machines and the like, the combination, with two adjacent numeral wheels, of an interposed internal gear wheel, a sun-gear turning with the numeral wheel, a planet gear interposed between and engaging said sun-gear and the internal gear, means for causing the turning of the lower order numeral wheel to oscillate said planet gear about the axis of the sun-gear and internal gear, to intermittently advance the latter, and a planetary gearing connecting the internal gear wheel with the higher order numeral wheel.

21. In a carrying mechanism for calculating machines and the like, the combination, with two adjacent numeral wheels, of an interposed internal gear wheel, a sun-gear turning with the lower order numeral wheel, a spring-retracted lever, a cam turning with the lower order numeral wheel for moving said lever in one direction, an oscillating gear-carrier connected with and moved by said lever, a planet gear carried by said gear-carrier and engaging said sun-gear and internal gear, and planetary gearing connecting said internal gear wheel with the higher order numeral wheel.

22. In a carrying mechanism for calculating machines and the like, the combination with a numeral wheel and a wheel adapted to be intermittently advanced by said numeral wheel, of a planetary gearing interposed between said wheels, means for causing the turning of the numeral wheel to oscillate one element of said planetary gearing to intermittently advance the other wheel, a higher order numeral wheel, a planetary gearing connecting the intermittently-advanced wheel with said higher order numeral wheel, and an actuating gear for the higher order numeral wheel carrying one of the gears of said planetary gearing.

23. In a carrying mechanism for calculating machines and the like, the combination, with a numeral wheel and a wheel adapted to be intermittently advanced by said numeral wheel, of a planetary gearing interposed between said wheels, means for causing the turning of the numeral wheel to oscillate one element of said planetary gearing to intermittently advance the other wheel, a sun-gear turned by said intermittently-advanced wheel, a higher order numeral wheel, an actuating gear therefor, and a planet gear carried by said actuating gear and in gear with both the sun-gear and the higher order numeral wheel.

24. In a carrying mechanism for calculating machines and the like, the combination, with a numeral wheel and a wheel adapted to be intermittently advanced by said numeral wheel, of a sun-gear and an internal gear, one of said gears turning with the numeral wheel and the other with the intermittently-advanced wheel, a planet gear interposed between and engaging the sun-gear and the internal gear, means for causing the turning of the numeral wheel to oscillate said planet gear about the axis of the sun-gear and internal gear, a higher order numeral wheel, a planetary gearing interposed between said intermittently-advanced wheel and said higher order numeral wheel, and an actuating gear for the higher order numeral wheel carrying one of the gears of said planetary gearing.

25. In a carrying mechanism for calculating machines and the like, the combination, with a numeral wheel and a wheel intermittently advanced by said numeral wheel, of a sun-gear and an internal gear, one turning with the numeral wheel and the other with the intermittently-advanced wheel, a spring-retracted lever, a cam turning with the numeral wheel and operating to move said lever in one direction, an oscillating gear-carrier connected to and moved by said lever, a planet gear carried by said gear-carrier and interposed between the sun-gear and internal gear, a higher order numeral wheel, a planetary gearing connecting the intermittently-advanced wheel with said higher order numeral wheel, and an actuating gear for the higher order wheel carrying one of the gears of said planetary gearing.

26. In a carrying mechanism for calculating machines and the like, the combination, with a numeral wheel and a sun-gear turning with it, of an internal gear intermittently advanced by the numeral wheel, a planet gear interposed between and engaging said sun-gear and internal gear, means for causing the turning of the numeral wheel to oscillate said planet gear about the axis of said sun-gear and internal gear, a higher order numeral wheel, a planetary gearing connecting said internal gear with said higher order numeral wheel, and an actuating gear for the higher order numeral wheel carrying one of the gears of said planetary gearing.

27. In a carrying mechanism for calculating machines and the like, the combination, with a numeral wheel and a sun-gear turning with it, of an internal gear intermittently advanced by the numeral wheel, a spring-retracted lever, a cam turning with the numeral wheel and operating to move said lever in one direction, an oscillating gear-carrier connected with and moved by said lever, a planet gear carried by said gear-carrier and interposed between said sun-gear and internal gear, a higher order numeral wheel, a planetary gearing connecting said internal gear with said higher order numeral wheel, and an actuating gear for said higher order wheel carrying one of the gears of said planetary gearing.

28. In a carrying mechanism for calculating machines and the like, the combination, with a numeral wheel and a wheel adapted to be intermittently advanced by the numeral wheel, of a planetary gearing interposed between said wheels, means for causing the turning of the numeral wheel to oscillate one element of said planetary gearing to intermittently advance the other wheel, a sun-gear turning with the intermittently-advanced wheel, a higher order numeral wheel, an actuating gear therefor, and a planet gear carried by said actuating gear and in gear with both the sun-gear and the higher order wheel.

29. In a carrying mechanism for calculating machines and the like, the combination, with a numeral wheel and a sun-gear turning with it, of an internal gear intermittently advanced by the numeral wheel, a spring-retracted lever, a cam turning with the numeral wheel and operating to move said lever in one direction, an oscillating gear-carrier connected with and moved by said lever, a planet gear carried by said gear-carrier and interposed between said sun-gear and internal gear, a sun-gear turning with the internal gear, a higher order numeral wheel, an actuating gear for said higher order wheel, and a planet gear carried by said actuating gear and in gear with both the sun-gear and the higher order wheel.

30. In a clearing or zeroizing mechanism for calculating machines and the like, the combination of a numeral wheel, a set of planetary gears connected therewith, one of said gears turning with the numeral wheel, and means for holding another one of said planetary gears stationary while moving the third one of said gears about the axis of the gear turning with the numeral wheel.

31. In a clearing or zeroizing mechanism for calculating machines and the like, the combination of a numeral wheel, a sun-gear and an internal gear, one of them turning with the numeral wheel and the other adapted to be held from movement during the zeroizing operation, a planet gear interposed between the sun-gear and internal gear, and means for moving the planet gear about the axis of the sun gear and internal gear while one of the latter is held stationary and the other permitted to turn with the numeral wheel.

32. In a clearing or zeroizing mechanism for calculating machines and the like, the combination of a numeral wheel, a sun-gear turning with said wheel, an internal gear adapted to be held from movement during the zeroizing operation, a planet gear interposed between the sun-gear and internal gear, and means for moving said planet gear about the axis of the sun-gear and internal gear while holding the latter from movement and permitting the sun-gear to turn with the numeral wheel.

33. In a clearing or zeroizing mechanism for calculating machines and the like, the combination of a numeral wheel, a sun-gear and an internal gear, one of said gears turning with the numeral wheel and the other adapted to be held from movement during the zeroizing operation, an oscillating gear-carrier mounted upon the axis of the sun-gear and internal gear, a planet gear carried by said gear-carrier and in mesh with both the sun-gear and the internal gear, and means for oscillating said gear-carrier about the axis of the sun-gear and internal gear while one of them is held stationary and the other permitted to turn with the numeral wheel.

34. In a clearing or zeroizing mechanism for calculating machines and the like, the combination of a numeral wheel, a sun-gear and an internal gear, one of said gears turning with the numeral wheel and the other adapted to be held from movement during the zeroizing operation, a spring-retracted lever, an oscillating gear-carrier connected with and moved by said lever, a planet gear carried by said gear-carrier and meshing with both the sun-gear and internal gear, and means for moving said lever to oscillate the gear-carrier while one of the first-mentioned gears is held from movement and the other permitted to turn with the numeral wheel.

35. In a clearing or zeroizing mechanism for calculating machines and the like, the combination of a numeral wheel, a sun-gear turning with said wheel, an internal gear adapted to be held from movement during the zeroizing operation, an oscillating gear-carrier hung upon the axis of the sun-gear and internal gear, a planet gear carried by said gear-carrier and in mesh with both the sun-gear and the internal gear, and means for oscillating said gear-carrier about the axis of the sun-gear and internal gear while holding the internal from movement and leaving the sun-gear free to turn with the numeral wheel.

36. In a clearing or zeroizing mechanism for calculating machines and the like, the combination of a numeral wheel, a sun-gear turning with said wheel, an internal gear adapted to be held from movement during the zeroizing operation, a spring-retracted lever, an oscillating gear-carrier connected to and moved by said lever, a planet gear carried by said gear-carrier and in mesh with both the sun-gear and the internal gear, and means for moving said lever to oscillate the gear-carrier about the axis of the sun-gear and internal gear while holding the latter stationary and permitting the sun-gear to turn with the numeral wheel.

37. In a clearing or zeroizing mechanism for calculating machines and the like, the combination of a numeral wheel, a sun-gear and an internal gear, one of them turning with the numeral wheel and the other adapted to be held from movement during the zeroizing operation, a cam also turning with the numeral wheel, an oscillating gear-carrier hung upon the axis of the sun-gear and internal gear and coöperating with said cam, a planet gear carried by said gear-carrier and meshing with both the sun-gear and the internal gear, and means independent of the cam for moving the oscillating gear-carrier while one of the first-mentioned gears is held stationary and the other permited to turn with the numeral wheel.

38. In a clearing or zeroizing mechanism for calculating machines and the like, the combination of a numeral wheel, a sun-gear and an internal gear, one of them turning with the numeral wheel and the other adapted to be held from movement during the zeroizing operation, a cam also turning with the numeral wheel, a spring-retracted lever coöperating with said cam, an oscillating gear-carrier connected to and moved by said lever, a planet gear carried by said carrier and interposed between the sun-gear and internal gear, and means independent of the cam for moving the lever in one direction while holding one of the first-mentioned gears stationary and permitting the other to turn with the numeral wheel.

39. In a clearing or zeroizing mechanism for calculating machines and the like, the combination of a numeral wheel, a cam and sun-gear turning with said wheel, an internal gear adapted to be held from movement during the zeroizing operation, a spring-retracted lever coöperating with said cam, an oscillating gear-carrier connected to and moved by said lever, a planet gear carried by said gear-carrier and engaging the sun-gear and the internal gear, and means independent of the cam for moving said lever to oscillate the gear-carrier about the axis of the sun-gear and internal gear while holding the latter stationary and permitting the sun-gear to turn with the numeral wheel.

40. In a clearing or zeroizing mechanism for calculating machines and the like, the combination of a plurality of numeral wheels, a plurality of sets of planetary gears, one connected with each numeral wheel and one gear of each set turning with its associated numeral wheel, and means common to all of said numeral wheels for holding a second one of the gears of each set stationary while moving the third about the axis of the gear turning with its associated numeral wheel.

41. In a clearing or zeroizing mechanism for calculating machines and the like, the combination of a plurality of numeral wheels, a sun-gear and an internal gear associated with each numeral wheel, one of them turning with the numeral wheel and the other adapted to be held from movement during the zeroizing operation, a plurality of planet gears, one associated with each numeral wheel and meshing with the sun-gear and the internal gear associated with that wheel, and means common to all of the planet gears for moving them about the axis of the sun-gears and internal gears while holding one of the latter set of gears stationary and permitting the other to turn with the respective numeral wheels.

42. In a clearing or zeroizing mechanism for calculating machines and the like, the combination of a plurality of numeral wheels, a sun-gear and an internal gear for each of said wheels, the sun-gear turning with the wheel and the internal gear adapted to be held from movement during the zeroizing operation, a plurality of planet gears interposed between the respective sun-gears and internal gears, and means common to all of the planet gears for moving them about the axis of the sun-gears and internal gears while the latter are held from movement.

43. In a clearing or zeroizing mechanism for calculating machines and the like, the combination of a plurality of numeral wheels, a sun-gear and an internal gear associated with each of said wheels, one of said gears turning with the numeral wheel and the other adapted to be held from movement during the zeroizing operation, a plurality of oscillating gear-carriers, one for each numeral wheel, mounted upon the axis of the sun-gears and internal gears, a plurality of planetary gears carried by said gear-carriers and interposed between the respective sun-gears and internal gears, and means common to all of said gear-carriers for oscillating them about the axis of the sun-gears and internal gears while one of the latter sets of gears is held stationary and the other permitted to turn with the numeral wheels.

44. In a clearing or zeroizing mechanism for calculating machines and the like, the combination of a plurality of numeral wheels, a sun-gear and an internal gear associated with each numeral wheel, one of said gears turning with the numeral wheel and the other adapted to be held from movement during the zeroizing operation, a plurality of cams turning with the respective numeral wheels, a plurality of spring-retracted levers coöperating with said cams, a plurality of oscillating gear-carriers connected with and moved by the respective levers, a planet gear carried by each of said carriers and interposed between the sun-gear and internal gear of the adjacent numeral wheel, and means common to all of said levers for moving them in unison to oscillate the gear-carriers while one of the first-mentioned set of gears is held from movement and the other permitted to turn with the numeral wheels.

45. In a clearing or zeroizing mechanism for calculating machines and the like, the combination of a plurality of numeral wheels, a sun-gear and a cam associated with each numeral wheel and turning with it, an internal gear associated with each sun-gear and adapted to be held from movement during the zeroizing operation, a spring-retracted lever and an oscillating gear-carrier associated with each numeral wheel and its gear and cam, said gear-carrier being connected to and moved by the lever, a planet gear carried by each gear-carrier and interposed between the adjacent sun-gear and internal gear, and means common to all of the levers for moving them in unison to oscillate the planet gears about the axis of the sun-gear and internal gears while holding the latter from movement and permitting the sun-gears to turn with the numeral wheels.

46. In a combined carrying and zeroizing mechanism for calculating machines and the like, the combination of a numeral wheel, a set of planetary gears connected therewith, one of said gears turning with the numeral wheel, means for causing the turning of the numeral wheel to oscillate another one of said planetary gears about the axis of the gear turning with the numeral wheel, and means independent of the numeral wheel for oscillating said gear about the axis of the gear turning with the numeral wheel while holding the third gear of the set of planetary gears from movement.

47. In a combined carrying and zeroizing mechanism for calculating machines and the like, the combination of a numeral wheel, a sun gear and an internal gear, one of them turning with the numeral wheel, a planet gear interposed between the sun-gear and internal gear, means for causing the turning of the numeral wheel to oscillate the planet gear about the axis of the sun-gear and internal gear, and means independent of the numeral wheel for oscillating said planet gear about the axis of the sun-gear and internal gear while holding one of said gears stationary and permitting the other to turn with the numeral wheel.

48. In a combined carrying and zeroizing mechanism for calculating machines and the like, the combination of a numeral wheel, a sun-gear turning with said wheel, an internal gear associated with said wheel, a planet gear interposed between the sun-gear and internal gear, means for causing the turning of the numeral wheel to oscillate the planet gear about the axis of the sun-gear and internal gear, and means independent of the numeral wheel for oscillating the planet gear about the axis of the sun-gear and internal gear while holding the latter from movement and permitting the sun-gear to turn with the numeral wheel.

49. In a combined carrying and zeroizing mechanism for calculating machines and the like, the combination of a numeral wheel, a sun-gear and an internal gear associated with said numeral wheel, an oscillating gear-carrier hung upon the axis of said sun-gear and internal gear, a planet gear carried by said gear-carrier and interposed between the sun-gear and internal gear, means for causing the turning of numeral wheel to oscillate said gear-carrier, and means independent of the numeral wheel for oscillating said gear-carrier while holding one of the first-mentioned gears stationary and permitting the other to turn with the numeral wheel.

50. In a combined carrying and zeroizing mechanism for calculating machines and the like, the combination of a numeral wheel, a sun-gear and an internal gear associated with said wheel, one of said gears turning with said wheel, a cam also turning with said wheel, an oscillating gear-carrier hung upon the axis of said sun-gear and internal gear and coöperating with said cam, a planet gear carried by said carrier and interposed between the sun-gear and internal gear, and means independent of the cam for oscillating the gear-carrier while holding one of the first-mentioned gears stationary and permitting the other to turn with the numeral wheel.

51. In a combined carrying and zeroizing mechanism for calculating machines and the like, the combination of a numeral wheel, a sun-gear and a cam turning with said wheel, an internal gear associated with said wheel, a spring-retracted lever coöperating with said cam, an oscillating gear-carrier connected to and moved by said lever, a planet gear carried by said carrier and interposed between the sun-gear and internal gear, and means independent of the cam for moving said lever to oscillate the gear-carrier while holding the internal gear from movement and permitting the sun-gear to turn with the numeral wheel.

52. In a combined carrying and zeroizing mechanism for calculating machines and the like, the combination of a plurality of numeral wheels, a sun-gear and an internal gear associated with each of said wheels and one of said gears turning with the wheel, a planet gear interposed between the sun-gear and internal gear, means for causing the turning of each numeral wheel to oscillate the planet gear about the axis of its associated sun-gear and internal gear, and means common to all of the planet gears for oscillating the planet gears about the axis of the sun-gears and internal gears while holding one of the latter set of gears stationary and permitting the other to turn with the numeral wheels.

53. In a combined carrying and zeroizing mechanism for calculating machines and the like, the combination of a plurality of numeral wheels, a sun-gear turning with each wheel, an internal gear associated with each wheel, a planet gear interposed between each sun-gear and internal gear, means for causing the turning of the numeral wheel to oscillate the planet gear about the axis of the sun-gear and internal gear, and means common to all of the planet gears for oscillating them about the axis of the sun-gears and internal gears while holding the latter stationary and permitting the sun-gears to turn with the numeral wheels.

54. In a combined carrying and zeroizing mechanism for calculating machines and the like, the combination of a plurality of numeral wheels, a sun-gear and cam turning with each numeral wheel, an internal gear associated with each numeral wheel, an oscillating gear-carrier likewise associated with each numeral wheel and coöperating with the cam turning therewith, a planet gear carried by each gear-carrier and interposed between the adjacent sun-gear and internal gear, and means common to all of the gear carriers for oscillating them about the axis of the sun-gears and internal gears while holding the latter stationary and permitting the sun-gears to turn with the numeral wheels.

55. In a combined carrying and zeroizing mechanism for calculating machines and the like, the combination of a plurality of numeral wheels, a sun-gear and cam turning with each wheel, an internal gear associated with each wheel, a spring-retracted lever likewise associated with each numeral wheel and coöperating with the cam thereof, an oscillating gear-carrier for each lever, connected to and moved by said lever, a planet gear carried by each gear-carrier and interposed between the adjacent sun-gear and internal gear, and means common to all of the levers for moving them in unison to oscillate the gear-carriers while holding the internal gears from movement and permitting the sun-gears to turn with the numeral wheels.

CLAIBORNE W. GOOCH.

Witnesses:
R. S. MIELERT,
R. W. FAIRCHILD.